(12) United States Patent
Kalevo et al.

(10) Patent No.: US 8,922,708 B2
(45) Date of Patent: Dec. 30, 2014

(54) APPARATUS METHODS AND COMPUTER READABLE STORAGE MEDIUMS FOR EXPOSURE CONTROL

(75) Inventors: Ossi Kalevo, Toijala (FI); Mikko A. Ollila, Tampere (FI); Mikko J. Muukki, Tampere (FI)

(73) Assignee: Nokia Corporation, Espoo (FI)

( * ) Notice: Subject to any disclaimer, the term of this patent is extended or adjusted under 35 U.S.C. 154(b) by 782 days.

(21) Appl. No.: 12/387,869

(22) Filed: May 7, 2009

(65) Prior Publication Data

US 2010/0285837 A1 Nov. 11, 2010

(51) Int. Cl.
*H04N 5/225* (2006.01)
*G03B 15/03* (2006.01)
*H04N 5/222* (2006.01)

(52) U.S. Cl.
CPC ...................... *G03B 15/03* (2013.01)
USPC .......................... 348/372; 348/371

(58) Field of Classification Search
USPC ...................... 348/370–372, 207.1
See application file for complete search history.

(56) References Cited

U.S. PATENT DOCUMENTS

| 5,634,146 | A | 5/1997 | Goo | |
|---|---|---|---|---|
| 6,314,243 | B1 | 11/2001 | Ishiguro | |
| 7,603,031 | B1 | 10/2009 | Viaud et al. | 396/159 |
| 7,664,387 | B2* | 2/2010 | Perala et al. | 396/166 |
| 7,683,965 | B2* | 3/2010 | Patino et al. | 348/370 |
| 7,863,869 | B1* | 1/2011 | De Stasi | 323/222 |
| 2003/0117491 | A1* | 6/2003 | Avni et al. | 348/77 |
| 2003/0147003 | A1* | 8/2003 | Kawase | 348/371 |
| 2004/0247305 | A1 | 12/2004 | Lee et al. | |
| 2005/0030416 | A1 | 2/2005 | Kametani et al. | 348/370 |
| 2006/0139480 | A1* | 6/2006 | Patino et al. | 348/370 |
| 2006/0198625 | A1 | 9/2006 | Okuno et al. | 396/155 |
| 2007/0142081 | A1 | 6/2007 | Lindqvist et al. | 455/556.1 |
| 2008/0056697 | A1* | 3/2008 | Perala et al. | 396/56 |
| 2009/0148148 | A1* | 6/2009 | Tanaka | 396/213 |
| 2009/0169194 | A1 | 7/2009 | Huang et al. | |

FOREIGN PATENT DOCUMENTS

| EP | 1 255 424 A2 | 11/2002 |
|---|---|---|
| EP | 1 720 342 A2 | 11/2006 |

* cited by examiner

*Primary Examiner* — Christopher K Peterson
(74) *Attorney, Agent, or Firm* — Harrington & Smith

(57) ABSTRACT

An apparatus including: a processor configured to control a flash unit in an exposure time period of an image sensor array, to provide a first non-zero light intensity in a first portion of the exposure time period and to provide a second non-zero light intensity, different to the first light intensity, in a second portion of the exposure time period.

13 Claims, 7 Drawing Sheets

APPARATUS METHODS AND COMPUTER READABLE STORAGE MEDIUMS FOR EXPOSURE CONTROL

FIELD OF THE INVENTION

Embodiments of the present invention relate to apparatus, methods and computer readable storage mediums. In particular, they relate to apparatus, methods and computer readable storage mediums in a mobile cellular telephone.

BACKGROUND TO THE INVENTION

Apparatus, such as mobile cellular telephones, may comprise a camera module having an image sensor array (for example, a charge coupled device camera or a complementary metal-oxide semiconductor camera) that enables a user to take photographs. If the ambient light intensity is relatively low, an additional source of light, such as a flash unit, may be required in order to obtain a photograph with acceptable brightness levels.

However, apparatus such as mobile cellular telephones usually comprise other electronic components that may require a relatively high current from an electrical energy storage device (such as a battery) of the apparatus. Since the flash unit may also require a relatively large current from the electrical energy storage device to operate, the electrical energy storage device may be unable to provide a sufficiently high current to both the flash unit and the other electronic component. If the image sensor array operates with a 'rolling shutter', a photograph obtained by the image sensor array may include artifacts (variations in brightness down the photograph for example) if the flash unit is disabled due to low current during exposure.

Therefore, it would be desirable to provide an alternative apparatus.

BRIEF DESCRIPTION OF VARIOUS EMBODIMENTS OF THE INVENTION

According to various, but not necessarily all, embodiments of the invention there is provided an apparatus comprising: a processor configured to control a flash unit in an exposure time period of an image sensor array, to provide a first non-zero light intensity in a first portion of the exposure time period and to provide a second non-zero light intensity, different to the first light intensity, in a second portion of the exposure time period.

The apparatus may be for wireless communications.

The processor may be configured to control the flash unit to provide the first non-zero light intensity in a plurality of portions of the exposure time period and to provide the second non-zero light intensity in a plurality of different portions of the exposure time period.

The first non-zero light intensity may be higher in intensity than the second non-zero light intensity.

An electrical energy storage device may be configured to provide a maximum output during the first portion of the exposure time period.

The processor may be configured to receive information indicative that another electronic component requires electrical energy and control the flash unit using the received information.

The received information may be indicative of radio frequency transmission and the processor may be configured to control the flash unit to provide the first non-zero light intensity during periods of time of non radio frequency transmission and to provide the second non-zero light intensity during periods of time of radio frequency transmission.

According to various, but not necessarily all, embodiments of the invention there is provided a device comprising an apparatus as described in any of the preceding paragraphs.

According to various, but not necessarily all, embodiments of the invention there is provided a mobile cellular telephone comprising an apparatus as described in any of the preceding paragraphs.

According to various, but not necessarily all, embodiments of the invention there is provided a method comprising: controlling a flash unit in an exposure time period of an image sensor array, to provide a first non-zero light intensity in a first portion of the exposure time period and to provide a second non-zero light intensity, different to the first light intensity, in a second portion of the exposure time period.

The method may further comprise controlling the flash unit to provide the first non-zero light intensity in a plurality of portions of the exposure time period and to provide the second non-zero light intensity in a plurality of different portions of the exposure time period.

The first non-zero light intensity may be higher in intensity than the second non-zero light intensity.

An electrical energy storage device may be configured to provide a maximum output during the first portion of the exposure time period.

The method may further comprise receiving information indicative that another electronic component requires electrical energy and controlling the flash unit using the received information.

The received information may be indicative of radio frequency transmission. The method may further comprise controlling the flash unit to provide the first non-zero light intensity during periods of time of non radio frequency transmission and to provide the second non-zero light intensity during periods of time of radio frequency transmission.

According to various, but not necessarily all, embodiments of the invention there is provided a computer readable storage medium encoded with instructions that, when executed by a processor, perform: controlling a flash unit in an exposure time period of an image sensor array, to provide a first non-zero light intensity in a first portion of the exposure time period and to provide a second non-zero light intensity, different to the first light intensity, in a second portion of the exposure time period.

The computer readable storage medium may be encoded with instructions that, when executed by a processor, perform controlling the flash unit to provide the first non-zero light intensity in a plurality of portions of the exposure time period and to provide the second non-zero light intensity in a plurality of different portions of the exposure time period.

The first non-zero light intensity may be higher in intensity than the second non-zero light intensity.

An electrical energy storage device may be configured to provide a maximum output during the first portion of the exposure time period.

The computer readable storage medium may be encoded with instructions that, when executed by a processor, perform receiving information indicative that another electronic component requires electrical energy and controlling the flash unit using the received information.

The received information may be indicative of radio frequency transmission and the computer readable storage medium may be encoded with instructions, that when executed by a processor, perform controlling the flash unit to provide the first non-zero light intensity during periods of time of non radio frequency transmission and to provide the second non-zero light intensity during periods of time of radio frequency transmission.

According to various, but not necessarily all, embodiments of the invention there is provided a computer program that, when executed by a processor, performs: controlling a flash unit in an exposure time period of an image sensor array, to provide a first non-zero light intensity in a first portion of the exposure time period and to provide a second non-zero light intensity, different to the first light intensity, in a second portion of the exposure time period.

According to various, but not necessarily all, embodiments of the invention there is provided an apparatus comprising: a processor configured to control a flash unit to provide light over a time period common to exposure time periods of a plurality of rows of image sensor elements of a rolling shutter image sensor array.

The processor may be configured to determine whether the intensity of ambient light is below a threshold light intensity and to control the flash unit to provide the light over the time period if the intensity of ambient light is below the threshold light intensity.

The processor may be configured to determine whether the intensity of ambient light is above the threshold light intensity and to control the flash unit to provide light over a time period that is substantially equal to the exposure time of all the sensor elements of the rolling shutter image sensor array if the intensity of the ambient light is above the threshold light intensity.

The processor may be configured to control the flash unit to provide a first non-zero light intensity in a first portion of the time period and to provide a second non-zero light intensity, different to the first light intensity, in a second portion of the time period.

The processor may be configured to control the flash unit to provide a first non-zero light intensity in a first portion of the time period and to provide zero light intensity in a second portion of the time period.

The processor may be configured to determine a distance of a focal point and to set the threshold light intensity using the determination.

The processor may be configured to determine whether a focal point is moving and to set the threshold light intensity using the determination.

The processor may be configured to determine an exposure time of the rolling shutter image sensor array and to set the threshold light intensity using the determination.

The processor may be configured to determine a frame rate of the rolling shutter image sensor array and to set the threshold light intensity using the determination.

The processor may be configured to determine a rate at which data is processed from the rolling shutter image sensor array and to set the threshold light intensity using the determination.

According to various, but not necessarily all, embodiments of the invention, there is provided a device comprising an apparatus as described in any of the preceding paragraphs.

According to various, but not necessarily all, embodiments of the invention there is provided a mobile cellular telephone comprising an apparatus as described in any of the preceding paragraphs.

According to various, but not necessarily all, embodiments of the invention there is provided a method comprising: controlling a flash unit to provide light over a time period common to exposure time periods of a plurality of rows of image sensor elements of a rolling shutter image sensor array.

According to various, but not necessarily all, embodiments of the invention there is provided a method comprising: controlling a flash unit to provide light over a time period common to exposure time periods of a plurality of rows of image sensor elements of a rolling shutter image sensor array.

The method may further comprise determining whether the intensity of ambient light is below a threshold light intensity and controlling the flash unit to provide the light over the time period if the intensity of ambient light is below the threshold light intensity.

The method may further comprise determining whether the intensity of ambient light is above the threshold light intensity and controlling the flash unit to provide light over a time period that is substantially equal to the exposure time of all the sensor elements of the rolling shutter image sensor array if the intensity of the ambient light is above the threshold light intensity.

The method may further comprise controlling the flash unit to provide a first non-zero light intensity in a first portion of the time period and to provide a second non-zero light intensity, different to the first light intensity, in a second portion of the time period.

The method may further comprise controlling the flash unit to provide a first non-zero light intensity in a first portion of the time period and to provide zero light intensity in a second portion of the time period.

The method may further comprise determining a distance of a focal point and setting the threshold light intensity using the determination.

The method may further comprise determining whether a focal point is moving and setting the threshold light intensity using the determination.

The method may further comprise determining an exposure time of the rolling shutter image sensor array and setting the threshold light intensity using the determination.

The method may further comprise determining a frame rate of the rolling shutter image sensor array and setting the threshold light intensity using the determination.

The method may further comprise determining a rate at which data is processed from the rolling shutter image sensor array and setting the ambient light threshold using the determination.

According to various, but not necessarily all, embodiments of the invention there is provided a computer readable storage medium, encoded with instructions that, when executed by a processor, perform: controlling a flash unit to provide light over a time period common to exposure time periods of a plurality of rows of image sensor elements of a rolling shutter image sensor array.

The computer readable storage medium may be encoded with instructions that, when executed by a processor, perform: determining whether the intensity of ambient light is below a threshold light intensity and controlling the flash unit to provide the light over the time period if the intensity of ambient light is below the threshold light intensity.

The computer readable storage medium may be encoded with instructions that, when executed by a processor, perform: determining whether the intensity of ambient light is above the threshold light intensity and controlling the flash unit to provide light over a time period that is substantially equal to the exposure time of all the sensor elements of the rolling shutter image sensor array if the intensity of the ambient light is above the threshold light intensity.

The computer readable storage medium may be encoded with instructions that, when executed by a processor, perform: controlling the flash unit to provide a first non-zero light intensity in a first portion of the time period and to provide a second non-zero light intensity, different to the first light intensity, in a second portion of the time period.

The computer readable storage medium may be encoded with instructions that, when executed by a processor, perform: controlling the flash unit to provide a first non-zero light intensity in a first portion of the time period and to provide zero light intensity in a second portion of the time period.

The computer readable storage medium may be encoded with instructions that, when executed by a processor, perform: determining a distance of a focal point and setting the threshold light intensity using the determination.

The computer readable storage medium may be encoded with instructions that, when executed by a processor, perform: determining whether a focal point is moving and setting the threshold light intensity using the determination.

The computer readable storage medium may be encoded with instructions that, when executed by a processor, perform: determining an exposure time of the rolling shutter image sensor array and setting the threshold light intensity using the determination.

The computer readable storage medium may be encoded with instructions that, when executed by a processor, perform: determining a frame rate of the rolling shutter image sensor array and setting the threshold light intensity using the determination.

The computer readable storage medium may be encoded with instructions that, when executed by a processor, perform: determining a rate at which data is processed from the rolling shutter image sensor array and setting the ambient light threshold using the determination.

According to various, but not necessarily all, embodiments of the invention there is provided a computer program that, when executed by a processor, performs: controlling a flash unit to provide light over a time period common to exposure time periods of a plurality of rows of image sensor elements of a rolling shutter image sensor array.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
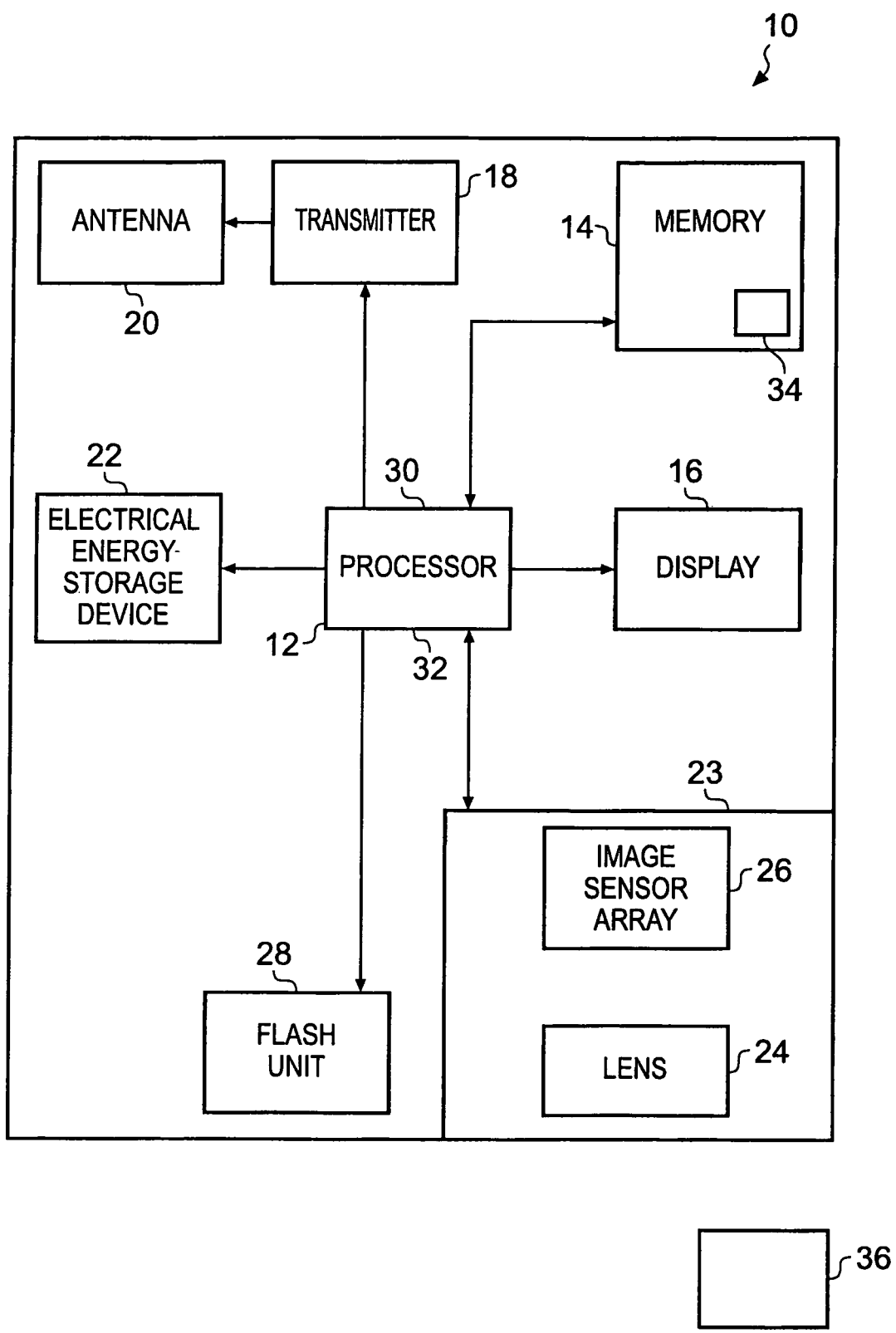
FIG. 1 illustrates a schematic diagram of an apparatus according to various embodiments of the invention.

FIG. 1 illustrates an apparatus 10 comprising: a processor 12 configured to control a flash unit 28 in an exposure time period of an image sensor array 26, to provide a first non-zero light intensity in a first portion of the exposure time period and to provide a second non-zero light intensity, different to the first light intensity, in a second portion of the exposure time period.

In the following description, the wording 'connect' and 'couple' and their derivatives mean operationally connected/coupled. It should be appreciated that any number or combination of intervening components can exist (including no intervening components).

FIG. 1 illustrates a schematic diagram of an apparatus 10 including a processor 12, a memory 14, a display 16, a transmitter 18, an antenna 20, an electrical energy storage device 22, a camera module 23 including a lens 24 and an image sensor array 26, and a flash unit 28. The apparatus 10 may be any device and may be, for example, a portable device such as a mobile cellular telephone, a personal digital assistant (PDA), a palmtop computer, a laptop computer, a personal computer (PC), a digital camera or a camcorder, or a module for such a device. As used here, 'module' refers to a unit or apparatus that excludes certain parts/components that would be added by an end manufacturer or a user.

The processor 12 may be any suitable processor and may be a microprocessor for example. Implementation of the processor 12 can be in hardware alone (a circuit for example), have certain aspects in software including firmware alone or can be a combination of hardware and software (including firmware).

The processor 12 may be implemented using instructions that enable hardware functionality, for example, by using executable computer program instructions in a general-purpose or special-purpose processor that may be stored on a computer readable storage medium (disk, memory etc) to be executed by such a processor.

The processor 12 is configured to read from and write to the memory 14. The processor 12 may also comprise an output interface 30 via which data and/or commands are output by the processor 12 and an input interface 32 via which data and/or commands are input to the processor 12.

The memory 14 may be any suitable memory and may, for example be permanent built-in memory such as flash memory or it may be a removable memory such as a hard disk, secure digital (SD) card or a micro-drive. The memory 14 stores a computer program 34 comprising computer program instructions that control the operation of the apparatus 10 when loaded into the processor 12. The computer program instructions 34 provide the logic and routines that enables the apparatus to perform the methods illustrated in FIGS. 4 and 6. The processor 12 by reading the memory 14 is able to load and execute the computer program 12.

The computer program instructions 34 provide: computer readable program means for controlling the flash unit 28 in an exposure time period of the image sensor array 26, to provide a first non-zero light intensity in a first portion of the exposure time period and to provide a second non-zero light intensity, different to the first light intensity, in a second portion of the exposure time period.

The computer program 34 may arrive at the apparatus 10 via any suitable delivery mechanism 36. The delivery mechanism 36 may be, for example, a computer-readable storage medium, a computer program product, a memory device, a record medium such as a CD-ROM, DVD or Blue-ray disk, an article of manufacture that tangibly embodies the computer program 34. The delivery mechanism may be a signal configured to reliably transfer the computer program 34. The apparatus 10 may propagate or transmit the computer program 34 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The display 16 is configured to receive and display data from the processor 12. The processor 12 may read data from the memory 14 and provide it to the display 16 for display to a user of the apparatus 10. The display 16 may be any suitable display and may be, for example, a thin film transistor (TFT) display, a liquid crystal display (LCD) or a light emitting diode (LED) display (for example, an organic light emitting diode (OLED) display).

The display 16 may be a touch screen display and include one or more sensors (not illustrated) for sensing the application of force by a user and for providing a control signal to the processor 12. The processor 12 may be configured to control the display 16 using control signals received from the one or more sensors.

The transmitter 18 is connected to the antenna 20 and to the processor 12. The processor 12 is configured to provide data to the transmitter 18. The transmitter 18 is configured to encode the data and provide it to the antenna 20 for transmission. The antenna 20 is configured to transmit the encoded data as a radio signal. The radio signal may have a frequency within a licensed cellular frequency band (for example, within a Global System for Mobile communications (GSM) frequency band (for example, 900 MHz)).

The electrical energy storage device 22 may be any device that is capable of storing electrical energy. For example, the electrical energy storage device 22 may be a battery (a device that converts chemical energy to electrical energy) and may be, for example, a nickel cadmium (NiCd) battery, a nickel metal hydride (NiMH) battery, lithium-ion (Li-ion) battery, or a lithium ion polymer battery. The electrical energy storage device 22 is configured to provide electrical energy to the processor 12, the memory 14, the display 16, the transmitter 18, the antenna 20, the camera module 22 and the flash unit 28 to enable them to function.

The lens 24 of the camera module 23 may be any optical device and may be a compound lens (an array of lenses). The lens 24 may be configured to focus light onto the image sensor array 26 and the processor 12 may be configured to control the focal length of the lens 24.

The image sensor array 26 may be any device that converts an optical image into an electrical signal. For example, the image sensor array 26 may be a charge coupled device (CCD) sensor or a complementary metal-oxide-semiconductor (CMOS) sensor. The processor 12 may be configured to read an electrical signal from the image sensor array 26 and control the display 16 to display the recorded image. The processor 12 may also be configured to read an electrical signal from the image sensor array 26 and store the recorded image data in the memory 14.

The image sensor array 26 may include a plurality of image sensor elements arranged in an X by Y array (where X represents the number of image sensor elements horizontally and Y represents the number of image sensor elements vertically). Consequently, the image sensor array 26 can be considered to comprise a plurality of rows of image sensor elements and a plurality of columns of image sensor elements.

The processor 12 may be configured to control the duration that the image sensor array 26 receives and records light (that is, the exposure time period). In various embodiments, the processor 12 is configured to control the image sensor array 26 so that substantially each image sensor element commences the same exposure time period at substantially the same moment in time. This is usually referred to as a 'global shutter' in the art of photography.

In other embodiments, the processor 12 is configured to control the image sensor array 26 so that there is a time delay between each successive row of image sensor elements for commencing the same exposure time period. For example, the processor 12 may commence an exposure time period of a first row of image sensor elements at a time, t. The processor 12 may then commence the same exposure time period of a second row of image sensor elements (adjacent the first row of image sensor elements) at a time, t+0.1 ms. The processor 12 may then commence the same exposure time period of a third row of image sensor elements (adjacent the second row of image sensor elements) at a time t+0.2 ms. The process is repeated so that substantially each row of image sensor elements may receive and record light. This process is usually referred to as a 'rolling shutter' in the art of photography.

The flash unit 28 may be any device that is configured to provide light for illumination of one or more objects. The flash unit 28 may include, for example, one or more light emitting diodes (LED), one or more Xenon flash units, one or more incandescent lamps, one or more light bulbs, one or more organic light emitting diodes (OLED). The processor 12 may be configured to determine the ambient light intensity using a signal from the image sensor array 26. If the processor 12 determines that the ambient light intensity is relatively low and that illumination is required, the processor 12 may control the flash unit 28 to provide light during at least a portion of the exposure time period of the image sensor array 26.

The operation of the apparatus 10 according to various embodiments of the present invention will now be described in the following paragraphs with reference to FIGS. 1, 2, 3 and 4.

Figure 2:
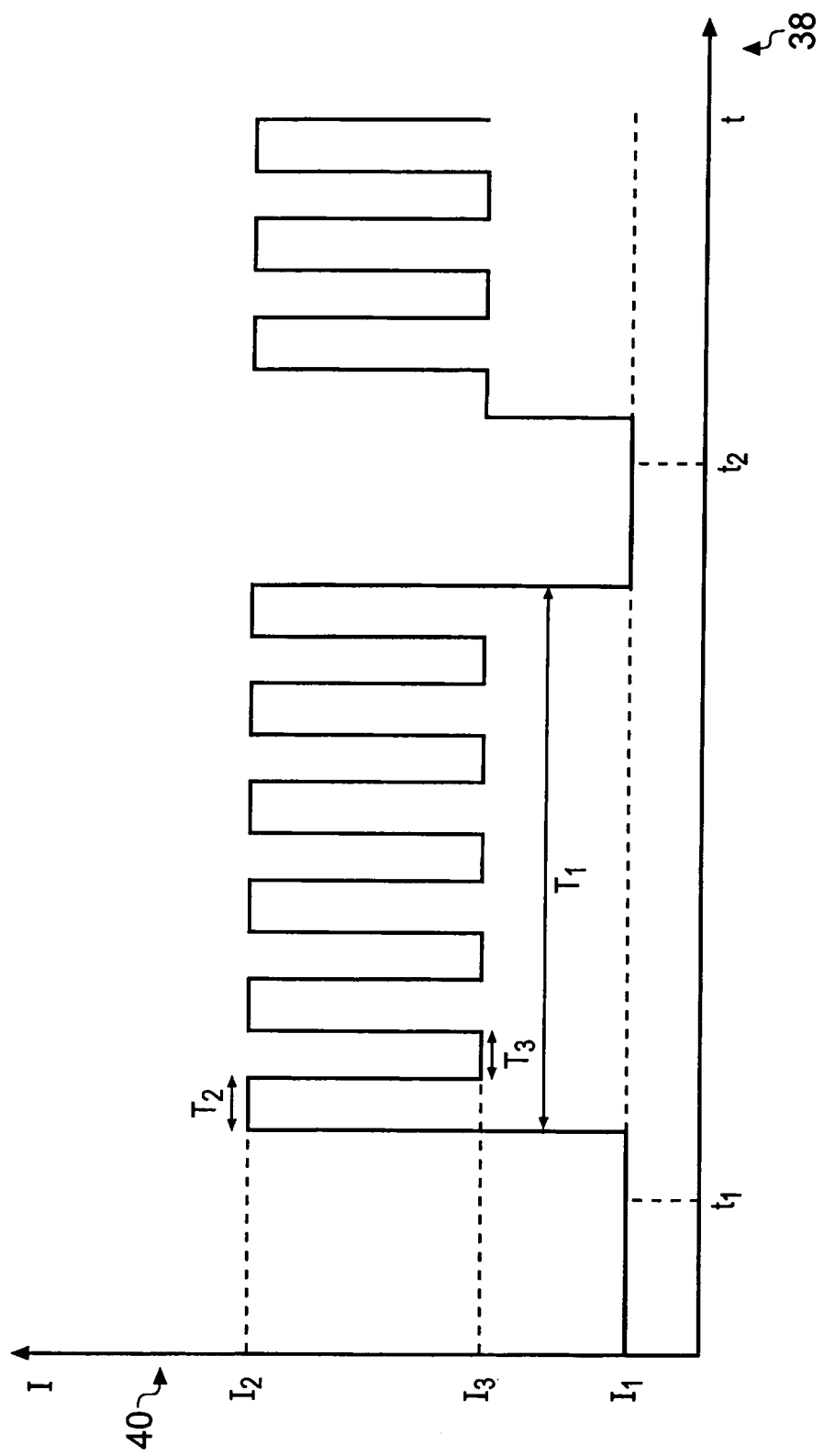
FIG. 2 illustrates a graph of time versus current output by an electrical energy storage device according to various embodiments of the invention.

FIG. 2 illustrates a graph of current output from the electrical energy storage device 22 over time according to various embodiments of the invention. In more detail, FIG. 2 illustrates a horizontal axis 38 for time (t) and a vertical axis 40 for current output by the electrical energy storage device 22.

The electrical energy storage device 22 provides a continuous base current $I_1$ to the electronic components (for example, the processor 12, the memory 14, the display 16 and so on) of the apparatus 10 to enable them to function. The electrical energy storage device 22 is configured to be able to provide a maximum current $I_2$ to the electronic components of the apparatus 10.

Figure 4:
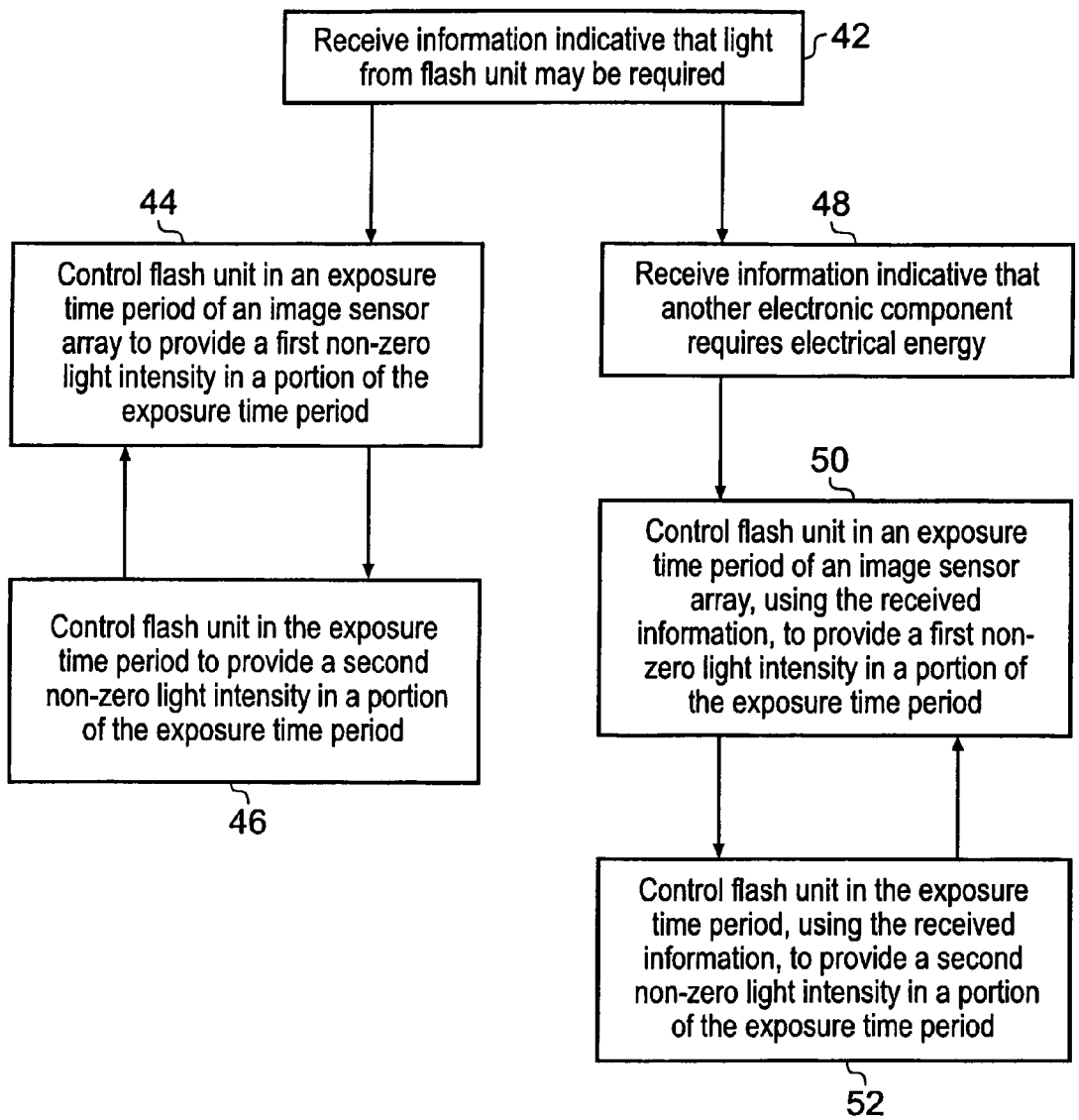
FIG. 4 illustrates a flow diagram of a method according to various embodiments of the invention.

With additional reference to FIG. 4, at a time $t_1$, the processor 12 receives information indicative that light from the flash unit 28 may be required for illumination (block 42). The information may indicate that a user wishes to record an image (that is, take a photograph) and may also indicate the ambient light intensity received at the image sensor array 26.

The processor 12 uses the received information to determine whether illumination by the flash unit 28 is required. If illumination by the flash unit 28 is required, the method moves to block 44.

The method then moves to block 44 and the processor 12 controls the flash unit 28 in an exposure time period $T_1$ (approximately 65 ms for example) of the image sensor array 26 to provide a first non-zero light intensity in a first portion $T_2$ (approximately 5 ms for example) of the exposure time period $T_1$. The flash unit 28 draws a current of $I=I_2-I_1$ from the electrical energy storage device 22 for the first time portion $T_2$. In other embodiments of the invention, the flash unit 28 may draw current that is less than $I_2-I_1$.

The method then moves to block 46 and the processor 12 controls the flash unit 28 in the exposure time period $T_1$ to provide a second non-zero light intensity (different to the first non-zero light intensity) in a second portion $T_3$ (approximately 7 ms for example) of the exposure time period $T_1$. The flash unit 28 draws a current of $I=I_3-I_1$ from the electrical energy storage device 22 for the second time portion $T_3$. $I_3$ may be an intermediate output current of the electrical energy storage device 22 and is greater than $I_1$ but is less than $I_2$.

The method then moves between blocks 44 and 46 for the remainder of the exposure time period $T_1$ so that the flash unit 28 provides the first non-zero light intensity in a plurality of portions of the exposure time period $T_1$ and provides the second non-zero light intensity in a plurality of different portions of the exposure time period $T_1$.

At time $t_2$ after the exposure time period $T_1$, the processor 12 may receive information that light from the flash unit 28 may be required (block 42) and method blocks 44 and 46 may be repeated as described above for another exposure time period of the image sensor array 26.

In various embodiments, the electrical energy storage device 22 may be unable to provide the maximum output current $I_2$ for more than a certain period of time (7 ms for example). Since the current (I) received by the flash unit 28 oscillates between a maximum and an intermediate output current, the flash unit 28 may receive a greater average current over the exposure time period $T_1$. Consequently, embodiments of the present invention may provide an advantage in that they may increase the average light intensity (that is, the root mean square of the light intensity) of the flash unit 28 in the exposure time period $T_1$.

Figure 3:
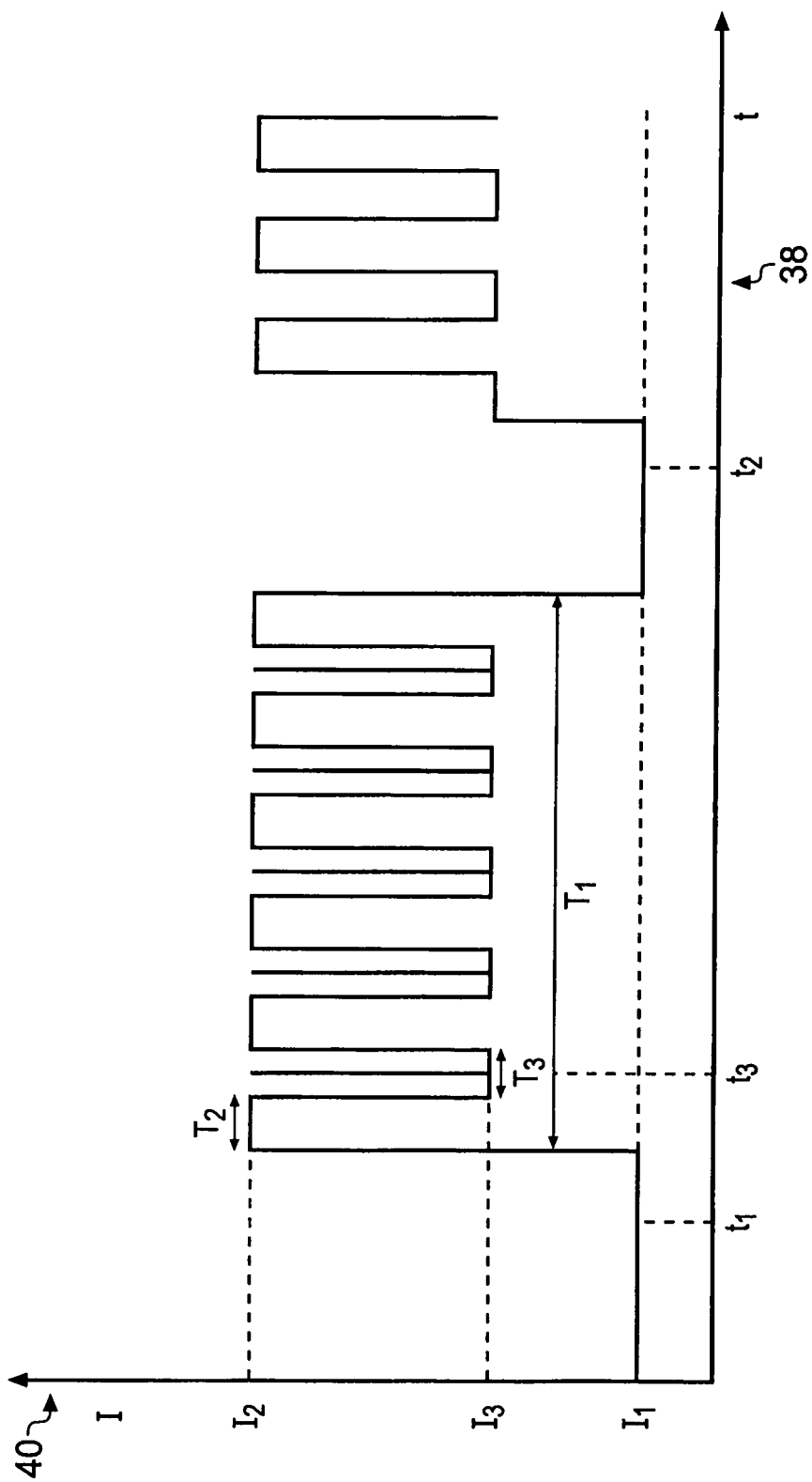
FIG. 3 illustrates another graph of time versus current output by an electrical energy storage device according to various embodiments of the invention.

FIG. 3 illustrates a graph of current output from the electrical energy storage device 22 over time according to other embodiments of the invention. FIG. 3 is similar to FIG. 2 and where the features are similar, the same reference numerals are used. Therefore, FIG. 3 also illustrates a horizontal axis 38 for time (t) and a vertical axis 40 for current output by the electrical energy storage device 22.

The electrical energy storage device 22 provides a continuous base current $I_1$ to the electronic components (for example, the processor 12, the memory 14, the display 16 and so on) of the apparatus 10 to enable them to function. The electrical energy storage device 22 is configured to be able to provide a maximum current $I_2$ to the electronic components of the apparatus 10.

With additional reference to FIG. 4, at a time $t_1$, the processor 12 receives information indicative that light from the flash unit 28 may be required for illumination (block 42). The information may indicate that a user wishes to record an image (that is, take a photograph) and may also indicate the ambient light intensity received at the image sensor array 26. The processor 12 uses the received information to determine whether illumination by the flash unit 28 is required. If illumination by the flash unit 28 is required, the method moves to block 48.

The processor 12 then receives information indicative that another electronic component requires electrical energy (block 48). The processor 12 may then use the information to synchronize the operation of the flash unit 28 and the other electronic component so that they may alternately draw a maximum current from the electrical energy storage device 22.

In various embodiments, the information is indicative of radio frequency transmission by the transmitter 18 and the antenna 20. The information may include data for the frequency of the radio frequency transmission and the moment of time for the first instance of transmission. The processor 12 may use this information to synchronize the operation of the flash unit 28 and the transmitter 18 so that they alternately draw a maximum current from the electrical energy storage device 22. The processor 12 may control the flash unit 28 to have the same frequency as the frequency of the radio frequency transmission. In other embodiments, the processor 12 may control the flash unit 28 to have a frequency that is an integer multiple of the frequency of the radio frequency transmission (that is, flash frequency=$N*f_{TX}$, where N is an integer (1, 2, . . . n) and $f_{TX}$ is the frequency of the transmitter 18).

The method then moves to block 50. The processor 12 uses the information received in block 48 to control the flash unit 28, in an exposure time period $T_1$ (approximately 65 ms for example) of the image sensor array 26, to provide a first non-zero light intensity in a first portion $T_2$ (approximately 5 ms for example) of the exposure time period $T_1$. The flash unit 28 draws a current of $I=I_2-I_1$ from the electrical energy storage device 22 for the first time portion $T_2$. In other embodiments of the invention, the flash unit 28 may draw a current that is less than $I_2-I_1$.

The method then moves to block 52. The processor 12 uses the information received in block 48 to control the flash unit 28, in the exposure time period $T_1$, to provide a second non-zero light intensity (different to the first non-zero light intensity) in a second portion $T_2$ (approximately 7 ms for example) of the exposure time period $T_1$. The flash unit 28 draws a current of $I=I_3-I_1$ from the electrical energy storage device 22 for the second time portion $T_3$. $I_3$ may be an intermediate output current of the electrical energy storage device 22 and is greater than $I_1$ but is less than $I_2$.

At a time $t_3$ during the second portion $T_3$, the processor 12 provides a signal for transmission to the transmitter 18 which draws a current $I_4=I_2-I_3$ from the electrical energy storage device 22. Consequently, at the time $t_3$ the flash unit 28 can also be considered to draw a current equal to $I=I_2-I_4-I_1$.

The duration $T_2$ of the current $I_2$ output by the electrical energy storage device 22 may be extended for transmission by the transmitter 18. The processor 12 may determine the transmission duration and control the flash unit 28 accordingly so that the flash unit 28 and the transmitter 18 do not require a high current during the same period of time. In various embodiments, the transmitter 18 may transmit for substantially the whole of the second time portion $T_3$ and the electrical energy storage device 22 may consequently provide the current $I_2$ for substantially the whole of the second time portion $T_3$.

In various embodiments of the invention, the transmitter 18 current $I_4$ may be greater than or less than $I_2-I_3$ depending on, for example, the required transmission power or the capacity of the electrical energy storage device 22. For example, if the duration of transmission is equal to $T_3$ and $T_3<T_2$, then a larger current may be drawn by the transmitter 18.

The method then moves between blocks 50 and 52 for the remainder of the exposure time period $T_1$ so that the flash unit 28 provides the first non-zero light intensity in a plurality of portions of the exposure time period $T_1$ and provides the second non-zero light intensity in a plurality of different portions of the exposure time period $T_1$. The processor 12 also provides signals to the transmitter 18 for transmission in the plurality of time portions where the flash unit 20 provides the second non-zero light intensity.

At a time $t_2$ after the exposure time period $T_1$, the processor 12 may receive information that light from the flash unit 28 is required (block 42) and method blocks 48, 50 and 52 may be repeated as described above for another exposure time period of the image sensor array 26.

The timing of transmission may be set by a protocol (GSM for example) and the processor 12 may synchronize the operation of the flash unit 28 so that the flash unit 28 receives a lower current $(I_2-I_4-I_1)$ whenever the transmitter 18 is transmitting. For example, the operation of the flash unit 28 may be synchronized to the first instance of transmission by the transmitter 18 and if transmission is due for when the flash unit 28 is due to receive a high current $(I_2-I_1)$, the processor 12 controls the flash unit 28 to receive a lower current $(I_3-I_1)$ instead. Consequently, the operation of the transmitter 18 may be prioritized over the operation of the flash unit 28 so that the flash unit 28 is synchronized to the operation of the transmitter 18.

Radio frequency transmission from the transmitter 18 and the antenna 20 may require a relatively high output current from the electrical energy storage device 22. Embodiments of the present invention provide an advantage in that the processor 12 is configured to synchronize the operation of the flash unit 28 so that it provides the second non-zero light intensity when the transmitter 18 and the antenna 20 are transmitting a radio frequency signal. Since the second non-zero light intensity draws a lower current from the electrical energy storage device 22 than the first non-zero light intensity, embodiments of the invention enable the apparatus 10 to provide light from the flash unit 28 and to provide a radio frequency transmission at the same time without exceeding the maximum output current $(I_2)$ from the electrical energy storage device 22. Consequently, embodiments of the present invention may reduce power consumption conflicts between the transmitter 19 and the flash unit 28.

In other embodiments of the invention, the flash unit 28 and the transmitter 18 may be synchronized so that the transmitter 18 and the antenna 20 transmit a signal in the first time portion $T_2$. In these embodiments, the flash unit 28 and the transmitter 18 may share the maximum current output 12 from the electrical energy storage device 22.

Further operation of the apparatus 10 according to various embodiments of the present invention will now be described in the following paragraphs with reference to FIGS. 1, 5A, 5B and 6.

Figure 5A:
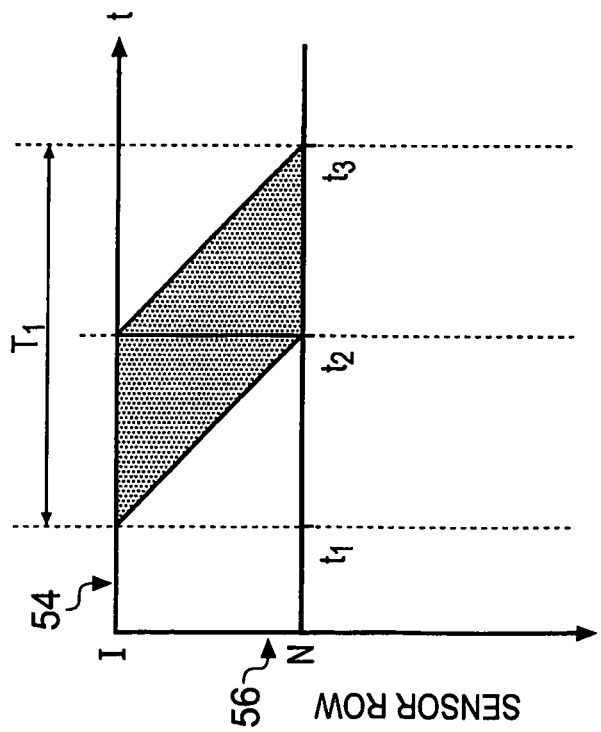
FIG. 5A illustrates a first graph of time versus sensor row according to various embodiments of the invention.

FIG. 5A illustrates a first graph of how each sensor element row of the image sensor array 26 may be exposed over time according to various embodiments of the invention. The graph includes a horizontal axis 54 that represents time (t) and a vertical axis 56 that represents each sensor element row from the first row to the Nth row of the image sensor array 26.

At a time $t_1$, the processor 12 controls the image sensor array 26 to expose the first image sensor element row. Additionally, the processor 12 controls the flash unit 28 to provide light at the time $t_1$. The processor 12 then controls the exposure of each successive image sensor element row so that there is a time delay between the exposure of each successive row (that is, the processor 12 controls the image sensor array 26 to have a 'rolling shutter'). The processor 12 controls the image sensor array 26 so that each row of image sensor elements is exposed for substantially the same period of time.

At a time $t_2$, the processor 12 controls the image sensor array 26 to end the exposure of the first image sensor element row and to start the exposure of the last (Nth) image sensor element row. At a time $t_3$, the processor 12 controls the image sensor array 26 to end the exposure of the last (Nth) image sensor element row. Also at the time $t_3$, the processor 12 deactivates the flash unit 28 to stop providing light.

Consequently, the overall exposure time period of the image sensor array 26 may be denoted by $T_1$ (that is, $T_1=t_3-t_1$) and the flash unit 28 provides light for substantially all of the exposure time period $T_1$. During the time period $T_1$, the processor 12 may control the operation of the flash unit 28 as described in the above paragraphs with reference to FIGS. 2 and 3. That is, the processor 12 may control the flash unit 28 so that it provides a first non-zero light intensity in at least a first portion of the time period $T_1$ and so that it provides a second non-zero light intensity (different to the first light intensity) in at least a second portion of the of the time period $T_1$. In other embodiments, the processor 12 may control the flash unit 28 to alternate between a relatively high light intensity and zero light intensity in the time period $T_1$.

Figure 5B:
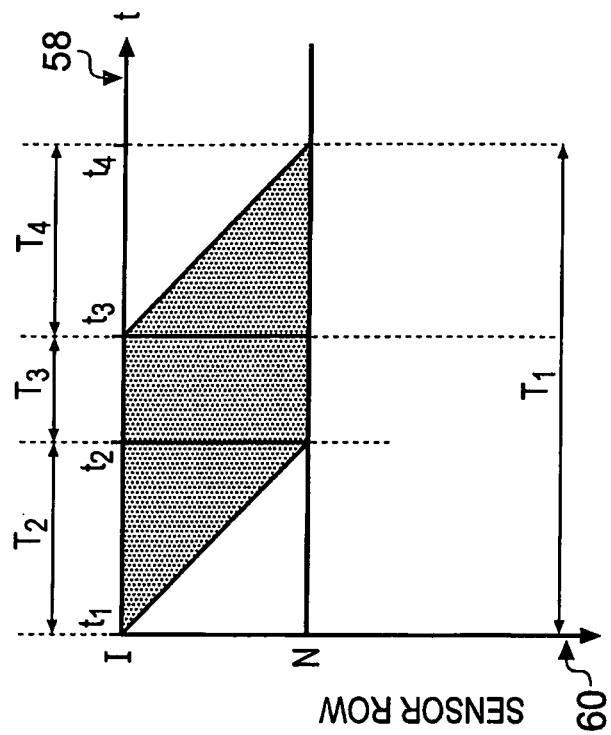
FIG. 5B illustrates a second graph of time versus sensor row according to various embodiments of the invention.

FIG. 5B illustrates a second graph of how each sensor element row of the image sensor array 26 may be exposed over time according to various embodiments of the invention. The graph includes a horizontal axis 58 that represents time (t) and a vertical axis 60 that represents each sensor element row from the first row to the Nth row of the image sensor array 26.

At a time $t_1$, the processor 12 controls the image sensor array 26 to expose the first image sensor element row. The processor 12 then controls the exposure of each successive image sensor element row so that there is a time delay between the exposure of each successive row (that is, the processor 12 controls the image sensor array 26 to have a 'rolling shutter'). The processor 12 controls the image sensor array 26 so that each row of image sensor elements is exposed for substantially the same period of time.

At a time $t_2$, the processor 12 controls the image sensor array 26 to commence the exposure of the last (Nth) image sensor element row and controls the flash unit 28 to provide light. At a time $t_3$, the processor 12 controls the image sensor array 26 to end the exposure of the first image sensor element row and deactivates the flash unit 28 to stop providing light. At a time $t_4$, the processor 12 controls the image sensor array 26 to end the exposure of the last (Nth) image sensor element row.

Consequently, the overall exposure time period of the image sensor array 26 may be denoted by $T_1$ (that is, $T_1=t_4-t_1$). During a time period $T_2$ (that is, $T_2=t_2-t_1$), the flash unit 28 is not activated and does not provide light. Consequently, the image sensor element rows exposed during the time period $T_2$ experience ambient light intensity.

During a time period $T_3$ (that is, $T_3=t_3-t_2$), the flash unit 28 is activated and provides light. The image sensor element rows exposed during the time period $T_3$ experience ambient light intensity and the light from the flash unit 28. Consequently, the flash unit 28 provides light over a time period that is common to substantially each image sensor element row. Therefore, the image sensor element rows exposed during the time period $T_3$ experience substantially the same light intensity from the flash unit 28.

During a time period $T_4$ (that is, $T_4=t_4-t_3$), the flash unit 28 is not activated and does not provide light. Consequently, the image sensor element rows exposed during the time period $T_4$ experience ambient light intensity.

The exposure/flash mode illustrated in FIG. 5B may provide an advantage in embodiments where another electronic component of the apparatus 10 (the transmitter 18 for example) requires a relatively high current output from the electrical energy storage device 22. In these embodiments, the operation of the flash unit 28 may be interrupted by electrical energy being drawn by another electronic component. However, the interruption may not substantially affect the quality of the image recorded by the image sensor array 26 because substantially each image sensor element row experiences the same light provided by the flash unit 28. Consequently, since each of the image sensor element rows are affected substantially the same, the recorded image may not include any image artifacts (variations in brightness down the recorded image for example).

During the time period $T_3$, the processor 12 may control the operation of the flash unit 28 as described in the above paragraphs with reference to FIGS. 2 and 3. That is, the processor 12 may control the flash unit 28 so that it provides a first non-zero light intensity in at least a first portion of the time period $T_3$ and so that it provides a second non-zero light intensity (different to the first light intensity) in at least a second portion of the of the time period $T_3$. In other embodiments, the processor 12 may control the flash unit 28 to alternate between a relatively high light intensity and zero light intensity in the time period $T_3$.

Figure 6:
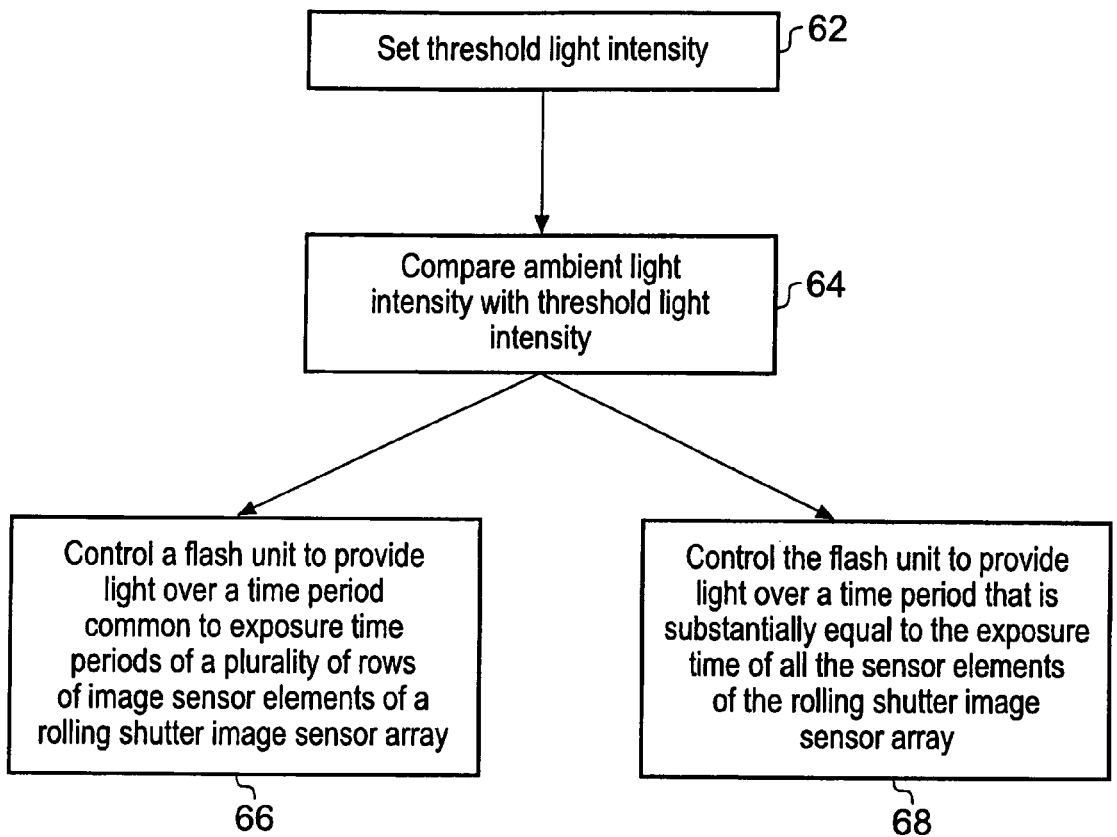
FIG. 6 illustrates a flow diagram of a method according to various embodiments of the invention.

FIG. 6 illustrates a flow diagram of a method of selecting one of the exposure/flash modes illustrated in FIGS. 5A and 5B.

At block 62, the processor 12 determines and sets a threshold light intensity. The processor 12 may determine a distance of a focal point of the lens 24 and set the threshold light intensity using the determination. For example, if the processor 12 determines that the focal point is relatively far, the processor 12 sets the threshold light intensity higher. If the processor 12 determines that the focal point is relatively close, the processor 12 sets the threshold light intensity lower. Additionally, if the processor 12 determines that the focal point is relatively close, the processor 12 may reduce the exposure time period of the sensor elements of the image sensor array 26 or reduce the time period that the flash unit 28 provides illumination.

The processor 12 may also set the threshold light intensity by determining whether a focal point of the lens 24 is moving. For example, if the processor 12 determines that the focal point is moving away, the processor 12 sets the threshold light intensity higher. If the processor 12 determines that the focal point is moving closer, the processor 12 sets the threshold light intensity lower.

The processor 12 may also set the threshold light intensity by determining an exposure time of the rolling shutter image sensor array 26. For example, if the processor 12 determines that the exposure time is high, the processor 12 sets the threshold light intensity lower.

The processor 12 may also set the threshold light intensity by determining a frame rate of the rolling shutter image sensor array 26. For example, if the processor 12 determines that the frame rate is high, the processor 12 sets the threshold light intensity higher.

The processor 12 may also set the threshold light intensity by determining a rate at which data is processed from the rolling shutter image sensor array 26. For example, if the processor 12 determines that the readout rate is high, the processor 12 sets the threshold light intensity higher.

At block 64, the processor 12 compares the ambient light intensity with the threshold light intensity. If the ambient light intensity is below the threshold light intensity, the method moves to block 66. If the ambient light intensity is above the threshold light intensity, the method moves to block 68.

At block 66, the processor 12 controls the flash unit 28 and the image sensor array 26 using the mode illustrated in FIG. 5A. That is, the processor 12 controls the flash unit 28 to provide light over a time period common to exposure time periods of a plurality of rows of image sensor elements of the image sensor array 26.

At block 68, the processor 12 controls the flash unit 28 and the image sensor array 26 using the mode illustrated in FIG. 5B. That is, the processor 12 controls the flash unit 28 to provide light over a time period that is substantially equal to the exposure time of all the sensor elements of the image sensor array 26.

Embodiments of the present invention provide advantage in that they may enable a high quality image to be recorded irrespective of whether another electronic component of the apparatus 10 (the transmitter 18 for example) requires a relatively high output current from the electrical energy storage device 22.

For example, if the ambient light intensity is relatively high, the processor 12 operates according to the mode illustrated in FIG. 5A and the flash unit 28 may draw a relatively low current from the electrical energy storage device 22 since only low illumination may be required. If another electronic component requires current, the electrical energy storage device 22 is able to provide current to both the flash unit 28 and the other electronic component simultaneously without affecting the quality of the image recorded by the image sensor array 26.

If the ambient light intensity is relatively low, the processor 12 operates according to the mode illustrated in FIG. 5B and the flash unit 28 may draw a relatively high current from the electrical energy storage device 22 since greater illumination may be required. If another electronic component requires current, the electrical energy storage device 22 may alter or interrupt the current being provided to the flash unit 28 without affecting the quality of the image recorded by the image sensor array 26 since each of the image sensor rows experiences the same light provided by the flash unit 28.

The blocks illustrated in the FIGS. 4 and 6 may represent steps in a method and/or sections of code in the computer program 34. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the processor 12 may represent a plurality of processors that carry out portions of the above described methods. In one embodiment, the camera module 23 may comprise a processor (which may be part of an image sensor) and the apparatus 10 may comprise a central processor. In this example, the camera module processor may control the operation of the flash unit 28 as illustrated in FIG. 2 until synchronization with a transmission signal is required. When transmission synchronization is required, the central processor of the apparatus 10 may take over control of the flash unit 28 and control the flash unit 28 as illustrated in FIG. 3.

In block 48 of FIG. 4, the information may alternatively be indicative that an audio power amplifier requires a high current. The information may include data for the operation of the audio power amplifier and the moment of time for the first instance of amplification. The processor 12 may use this information to synchronize the operation of the flash unit 28 and the audio power amplifier so that they alternately draw a maximum current from the electrical energy storage device 22.

Figure 7:
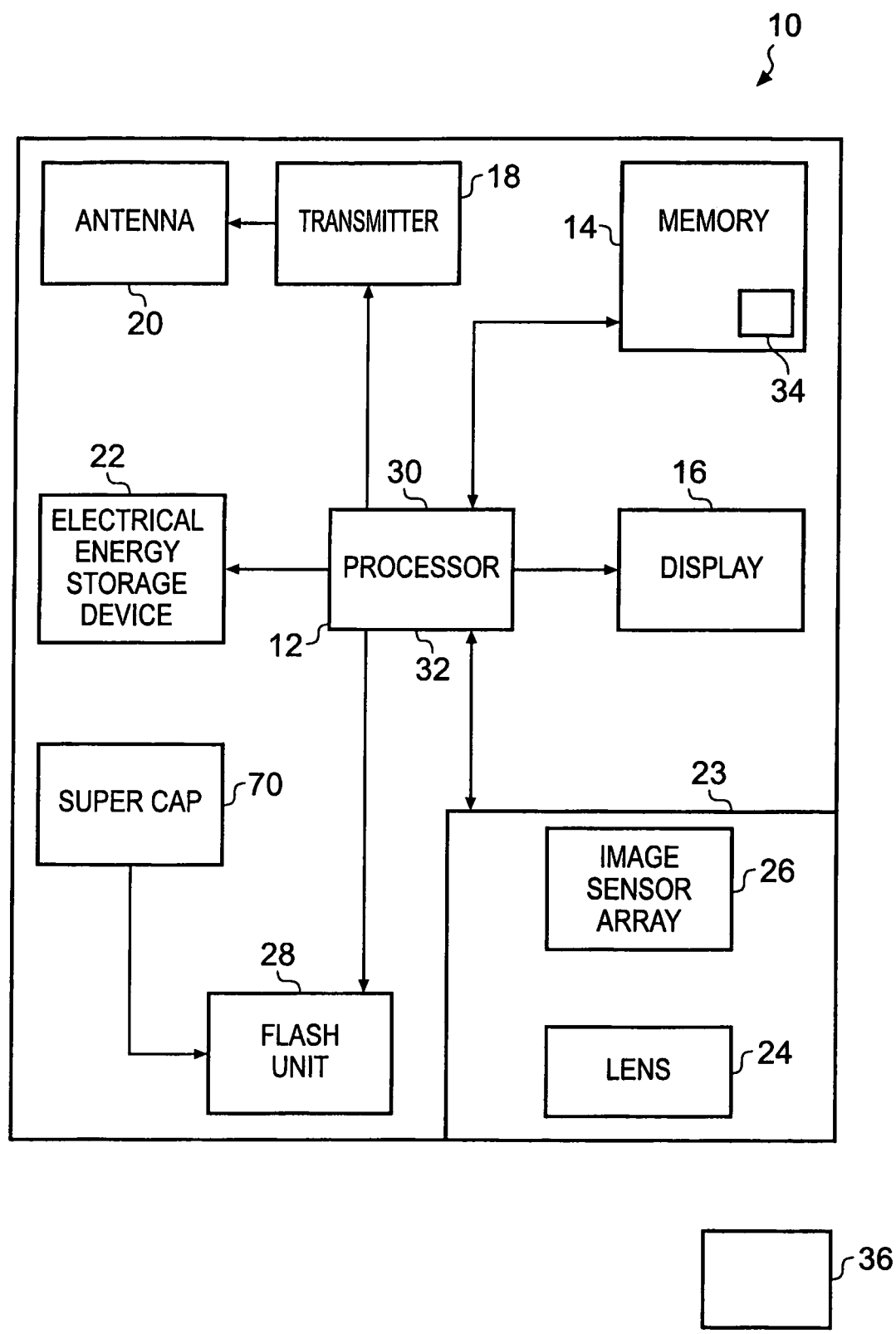
FIG. 7 illustrates a schematic diagram of another apparatus according to various embodiments of the present invention.

FIG. 7 illustrates a schematic diagram of another apparatus 10 according to various embodiments of the present invention. The apparatus 10 illustrated in FIG. 7 is similar to the apparatus illustrated in FIG. 1 and where the features are similar, the same reference numerals are used.

The apparatus 10 illustrated in FIG. 7 additionally includes a 'super capacitor' 70 (which may also be referred to as a 'Supercap', an electric double-layer capacitor, an electrochemical double layer capacitor (EDLC) or an ultra capacitor) that is configured to provide electrical energy to the flash unit 28. Super capacitors are well known in the art of electronics and will not be described in detail here.

Embodiments of the invention as illustrated in FIG. 7 provide an advantage in that they may increase the current provided to the flash unit 28 and consequently increase the light intensity that may be provided by the flash unit 28. By way of example and with reference to FIGS. 2 and 3, if the Supercap 70 is configured to be able to provide a current $I_5$, the current received by the flash unit 28 in the first portion $T_2$ would be $I=I_2+I_5-I_1$ and the current received by the flash unit 28 in the second portion $T_3$ would be $I=I_3+I_5-I_1$.

Since the flash unit 28 receives current from both the electrical energy storage device 22 and the Supercap 70, a manufacturer may be able to reduce the current required from the Supercap 70 and consequently reduce the size of the Supercap 70 in the apparatus 10. This may also advantageously enable the manufacturer to reduce the size of the apparatus 10.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    at least one processor;
    and at least one memory including computer program code;
    the at least one memory and the computer program code configured to, with the at least one processor, cause the at least one processor to control a flash unit in an exposure time period of an image sensor array, wherein the at least one processor is further configured to receive information indicative that there is a requirement for electrical energy other than by the at least one processor and flash unit and control the flash unit in the exposure time period of the image sensor array, using the received information, to provide a first non-zero light intensity in a first portion of the exposure time period and to provide a second non-zero light intensity in a second portion of the exposure time period, wherein the intensity of the first non-zero light intensity is different to the intensity of the second non-zero light intensity.

2. An apparatus as claimed in claim 1, wherein the at least one processor is configured to control the flash unit to provide the first non-zero light intensity in a plurality of portions of the exposure time period and to provide the second non-zero light intensity in a plurality of different portions of the exposure time period.

3. An apparatus as claimed in claim 1, wherein the first non-zero light intensity is higher in intensity than the second non-zero light intensity.

4. An apparatus as claimed in claim 3, wherein an electrical energy storage device is configured to provide a maximum output during the first portion of the exposure time period.

5. An apparatus as claimed in claim 1, wherein the received information is indicative of radio frequency transmission and the at least one processor is configured to control the flash unit to provide the first non-zero light intensity during periods of time of non radio frequency transmission and to provide the second non-zero light intensity during periods of time of radio frequency transmission.

6. A device comprising an apparatus as claimed in claim 1.

7. A method comprising:
    receiving information indicative that there is a requirement for electrical energy other than by a processor and flash unit and controlling the flash unit in an exposure time period of an image sensor array using the received information, to provide a first non-zero light intensity in a first portion of the exposure time period and to provide a second non-zero light intensity in a second portion of the exposure time period, wherein the intensity of the first non-zero light intensity is different to the intensity of the second non-zero light intensity.

8. A method as claimed in claim 7, further comprising controlling the flash unit to provide the first non-zero light intensity in a plurality of portions of the exposure time period and to provide the second non-zero light intensity in a plurality of different portions of the exposure time period.

9. A method as claimed in claim 7, wherein the first non-zero light intensity is higher in intensity than the second non-zero light intensity.

10. A method as claimed in claim 9, wherein an electrical energy storage device is configured to provide a maximum output during the first portion of the exposure time period.

11. A method as claimed in claim 7, wherein the received information is indicative of radio frequency transmission and the method further comprises controlling the flash unit, to provide the first non-zero light intensity during periods of time of non radio frequency transmission and to provide the second non-zero light intensity during periods of time of radio frequency transmission.

12. A non-transitory computer readable storage medium encoded with instructions that, when executed by a processor, perform:
    receiving information indicative that there is a requirement for electrical energy other than by a processor and flash unit and controlling the flash unit in an exposure time period of an image sensor array using the received information, to provide a first non-zero light intensity in a first portion of the exposure time period and to provide a second non-zero light intensity in a second portion of the exposure time period, wherein the intensity of the first non-zero light intensity is different to the intensity of the second non-zero light intensity.

13. A non-transitory computer readable storage medium as claimed in claim 12, encoded with instructions that, when executed by a processor, perform controlling the flash unit to provide the first non-zero light intensity in a plurality of portions of the exposure time period and to provide the second non-zero light intensity in a plurality of different portions of the exposure time period.

* * * * *